(12) United States Patent
Wankmueller et al.

(10) Patent No.: US 8,151,335 B2
(45) Date of Patent: Apr. 3, 2012

(54) PROXY AUTHENTICATION METHODS AND APPARATUS

(75) Inventors: John Wankmueller, Great Neck, NY (US); Cristian Radu, Beauvechain (BE); David Anthony Roberts, Warrington (GB)

(73) Assignee: MasterCard International Incorporated, Purchase, NY (US)

( * ) Notice: Subject to any disclaimer, the term of this patent is extended or adjusted under 35 U.S.C. 154(b) by 551 days.

(21) Appl. No.: 11/566,478

(22) Filed: Dec. 4, 2006

(65) Prior Publication Data

US 2008/0082452 A1    Apr. 3, 2008

Related U.S. Application Data

(63) Continuation of application No. PCT/US2006/038679, filed on Oct. 3, 2006.

(51) Int. Cl.
*G06F 17/30* (2006.01)

(52) U.S. Cl. ............... 726/9; 726/2; 705/35; 705/38; 705/64; 705/65; 705/66; 455/411; 455/503; 370/254; 370/255

(58) Field of Classification Search ............... 726/2, 9; 705/64–66, 35, 38; 455/411, 503; 380/249; 713/193; 370/254–255
See application file for complete search history.

(56) References Cited

U.S. PATENT DOCUMENTS

| | | | |
|---|---|---|---|
| 5,148,481 A * | 9/1992 | Abraham et al. | 380/46 |
| 5,586,166 A * | 12/1996 | Turban | 455/558 |
| 6,478,230 B1 * | 11/2002 | Deutschmann | 235/492 |
| 7,366,918 B2 * | 4/2008 | Barlow et al. | 713/193 |
| 7,848,768 B2 * | 12/2010 | Omori et al. | 455/503 |
| 2002/0120559 A1 * | 8/2002 | O'Mara et al. | 705/38 |

* cited by examiner

*Primary Examiner* — Thanhnga B Truong
(74) *Attorney, Agent, or Firm* — Baker Botts L.L.P.

(57) ABSTRACT

A proxy authentication method and apparatus is described for use in user authentication, e.g. for payment transactions.
The authentication is carried out before the transaction between a electronic, e.g. digital identification device and a person terminal. Verification information is entered at the personal terminal to authenticate the user and if this is successful a verification flag is set in the digital identification device.
The status of this flag, or an encrypted version thereof can be used by a transaction terminal of evidence that the user has been authenticated without having to transmit any secret identification information to the transaction terminal.

21 Claims, 6 Drawing Sheets

PROXY AUTHENTICATION METHODS AND APPARATUS

CROSS-REFERENCE TO RELATED APPLICATIONS

This application is a continuation of International Patent Application No. PCT/US 06/38679 filed on Oct. 3, 2006, entitled "Proxy Authentication Methods and Apparatus," the entire disclosure of which is incorporated herein by reference and from which priority is claimed.

The invention relates to transaction systems, apparatus and methods and in particular to an Account Holder Verification Method and Apparatus for use in such systems and methods. In particular the invention concerns apparatus and methods for performing Account Holder Verification before initiation of a payment transaction.

TECHNICAL BACKGROUND

The international payment brands MasterCard, Visa, and Europay agreed in 1993 to work together to develop specifications for the use of smart cards in payment cards used as either a debit or a credit card and later as electronic purses. The first version of the EMV system was released in 1994. In 1998 a stable release of the specifications was available. The specification has been upgraded in 2000 and 2004. With the exception of the United States there has been significant progress in the deployment of EMV-compliant point of service or point-of sale equipment and the issuance of debit and or credit cards adhering to the EMV specifications. EMV-compliant point of service or point-of sale equipment is able to accept and read smart cards.

Smart cards with contactless interfaces are becoming increasingly popular for payment and ticketing applications. An easy-to-implement version is currently being deployed in the USA. Use of wireless communications in completing transactions increases the difficulty of maintaining confidential information, such as PIN codes.

A quickly growing application is in digital identification cards. In this application, the cards are used for authentication of identity. The most common example is in conjunction with a public key infrastructure. The smart card will store a digital certificate issued from the public key infrastructure along with any other relevant or needed information about the card holder. When combined with biometrics, smart cards can provide two- or three-factor authentication and can enhance privacy.

Smart cards are considered suitable for these tasks, because they are engineered to be tamper resistant. The embedded chip of a smart card usually implements some cryptographic algorithm.

Many problems exist in current methods of issuance and use of credit card, debit card, electronic purse cards or the like and examples of such problems include:

a) Fraud at non-EMV terminals such as skimming attack. Such terminals read the card's magnetic stripe and are not equipped to interact with chip-cards (integrated-circuit-cards) that for example conform to the EMV (Europay MasterCard Visa) standard. Skimming attack frauds occur when the card's magnetic stripe is recorded and the user's PIN is recorded by electronic or visual means such as a camera near to the PIN-pad.

b) No Cardholder Verification Method (CVM) at EMV CAT level 2 and level 3 transactions: in such cases transaction value limits have to be small and small frauds may occur. All EMV CAT level 2 terminal is an EMV Cardholder Activated Terminal that has no PIN-pad and which may go online to the issuer. An EMV CAT level 3 terminal is an EMV Cardholder Activated Terminal that has no PIN-pad and is off-line only.

c) Contactless card transactions that maintain the 'Tap & Go' convenience and speed do not require a PIN (Personal Identification Number) to be entered to authenticate the account user and therefore have low transaction limits.

d) Terminal costs increase when particular security measures are used such as encrypted PIN-pad, Secure Application Module (SAM) for proprietary encrypted off-line PIN and secure chip-card readers.

e) Network operation costs are high due to security requirements for encrypted online PIN verification.

f) Cardholder's interaction time at a point-of-service is long due to a requirement to type-in a PIN.

g) Fraud occurs in active attacks on contactless cards. Such attacks are sometimes referred to in the literature as "electronic pick-pocketing and re-presentment", "re-play" or even "pre-play attacks". A pre-play attack is one where legitimate authentication data is submitted by the attacker before the legitimate user submits it, therefore getting the authorised services and causing the legitimate user to be denied access. The hacker may mount a fraudulent contactless transaction by approaching the Cardholder's pocket with a battery powered proximity reader that can trigger a contactless payment transaction response from the payment card or device or the proximity reader may be modified by a dishonest merchant or their clerk to fetch information from the proximity card/device for more than the current transaction.

h) High costs are incurred to achieve security for off-line payment methods that require cardholder to key-in a PIN into a transaction terminal. An example high-cost security method requires a physically secured chip card reader so that a person attempting fraud cannot physically tap the ISO7816/EMV Level 1 interface and record the PIN; this increases the cost of the transaction terminal. A second example high-cost security method requires an off-line encrypted PIN which is a logically protected channel with RSA encryption so that a person attempting fraud cannot read the PIN from the digital envelope when weak physical security exists; this increases the cost of the chip-card which must include a crypto-processor. This is usually the cryptographic method used when interoperability is a requirement, as in the case of EMV, or when the use of a Secure Application Module (SAM) in the transaction terminal for implementing a proprietary encrypted off-line PIN method is deemed prohibitive due to cost and operational complexity.

i) Low security exists with LVP (low value payment) cards since there is no cardholder verification method. People other than the eligible Cardholder can use a lost or stolen card until the available balance on the card is depleted. LVP cards are otherwise often known as e-purse or electronic purse cards. Security could be provided by requiring the use of PIN at any point-of-service, however many LVP service providers such as for vending machines and parking meters for example will not bear the extra cost to support secure PIN entry on their transaction terminals.

WO 2006/053191 describes the use of dynamic codes instead of PIN codes. This increases the security especially when the dynamic code is only used once. However, the complexity of the network is not reduced as the dynamic code is sent through the network and treated in the same way as a PIN code.

SUMMARY OF THE PRESENT INVENTION

It is an object of the present invention to provide a transaction system and method and in particular an Account Holder Verification Method and Apparatus for use in such systems and methods. In particular it is an object of the present invention to provide apparatus and methods for performing Account Holder Verification before initiation of a payment transaction.

The present invention provides a method for authorizing a transaction using a personal terminal, a transaction terminal and an electronic identification device (such as a digital identification device) having memory, the electronic identification device having been offered up to the personal terminal for communication therewith and verification information (i.e. user verification information) having been entered into the personal terminal, the method comprising: the personal terminal verifying if the verification information is valid and setting a verification flag in the memory of the electronic identification device indicative of the verification information being valid, and receiving evidence of the status of the verification flag at the transaction terminal from the electronic identification device.

The advantage of this method is that it allows a secure authorization without requiring confidential information to be transferred or entered at the transaction terminal itself. As the authentication is done away from the transaction terminal and via a different terminal, i.e. the personal terminal, this is called the proxy authentication.

The evidence can be generated by the electronic identification device by a computation of cryptographic code, e.g. in the form of a digital signature. The use of cryptographic codes increase the security especially for wireless information transfer while not increasing the complexity severely.

In one embodiment the transaction terminal verifies the evidence offline. This avoids the need for connection to a network to contact a host.

In another embodiment, the verification of the evidence is carried out online by an authorization entity of an issuer of the electronic identification device, e.g. via a Message Authentication Code.

The user verification information can be a secret identification code. In this way conventional identification codes can be used such as a PIN. However any other identification code or data can be used as technology progresses, e.g. the user verification information can be biometric data.

The method may also include storing a cryptographic authentication token in the electronic identification device, the cryptographic authentication token being evidence of the status of the verification flag. By storing this code, the proxy authentication can be done before the transaction takes place while still having the necessary evidence to complete a transaction in an unsafe environment. Hence, the transaction terminal will then typically authorize a transaction at the transaction terminal in response to the receipt of the evidence. After this the transaction terminal and/or the electronic identification device may optionally delete the cryptographic authentication and/or change the status of the verification flag to that of not-authenticated.

The evidence can be transmitted from the transaction terminal to the authorization entity over a communications link. After receiving a response from said authorization entity, the transaction terminal authorizes a transaction at the transaction terminal in response to the received response. This allows the new authentication process to be included conveniently in conventional transaction processing.

As indicated above the present invention can provide a three-factor authentication wherein the user provides three means of identification, one of which is a physical token, e.g. the electronic identification device, the second can be something known to or owned by the user such as a security code (e.g. a PIN) or a biometric information and the third factor is the personal terminal/verification flag.

The present invention includes possession of a physical token as a first authentication factor and a password, biometric data, such as a finger-scanning or a voiceprint as a second authentication factor.

The present invention also includes three- or more-factor authentication. For example the present invention includes possession of two physical tokens (e.g. an electronic identification device and a personal terminal) and a password, used in conjunction with biometric data, such as a finger-scanning or a voice-print. For example the present invention also includes possession of a physical token (e.g. electronic identification device) and a password, used in conjunction with biometric data, such as a finger-scanning or a voice-print.

The present invention also provides a system for authorizing a transaction using a personal terminal, a transaction terminal and an electronic identification device having memory, the electronic identification device having been offered up to the personal terminal for communication therewith and verification information (i.e. user verification information) having been entered into the personal terminal, wherein: the personal terminal has means for verifying if the verification information is valid and for setting a verification flag in the memory of the electronic identification device indicative of the verification information being valid, and the transaction terminal has means for receiving evidence of the status of the verification flag at the transaction terminal from the electronic identification device. The electronic identification device and/or the personal terminal can have means for generating the evidence as a cryptographic code.

To improve security, the means for generating evidence can be adapted to generate this as a cryptographic code, e.g. by generating a digital signature.

The transaction terminal can have means for verifying the evidence offline or online. In the latter case, the system preferably has means for verification of the evidence online by an authorization entity of an issuer of the electronic identification device. In such a case the evidence can be in the form of a Message Authentication Code.

To improve security the user verification information can be in the form of a secret identification code, e.g. a PIN. However, the invention is not limited thereto and can include devices for providing any other form of verification, e.g. finger print scanners and recognition devices, biometric data scanners and recognition devices, iris scanners and recognition devices, etc.

Preferably, the electronic identification device has means for storing a cryptographic authentication token in the electronic identification device, the cryptographic authentication token being evidence of the status of the verification flag.

Independent of whether the authentication is done off-line or on-line, the transaction terminal can have means to authorize a transaction at the transaction terminal in response to the receipt of the evidence.

For online authentication, the transaction terminal can have means for transmitting the evidence from the transaction terminal to the authorization entity over a communications link, means for receiving a response from said authorization entity; and means for authorizing a transaction at the transaction terminal in response to said received response.

The present invention also provides a personal terminal for use with an electronic identification device having memory, the personal terminal comprising means for communicating with the digital identification device, means for entering verification information (i.e. user verification information), means for verifying if the verification information is valid and for sending via the means for communicating a verification flag to be set in the memory of the electronic identification device indicative of the verification information being valid.

The personal terminal may also have means for generating the evidence as a cryptographic code. The means for generating evidence as a cryptographic code can have means for generating a digital signature.

The present invention also includes any software necessary to carry out any of the methods of the present invention. The present invention also includes a storage medium storing any of such software.

The present invention also includes an electronic identification device having memory with the memory storing a verification flag indicative of verification information being valid.

An advantage of the present invention is that it can provide a solution to at least one of the known problems of the prior art by separating the cardholder authentication stage from the payment transaction stage. This achieved in accordance with the present invention by means of a proxy authentication method and apparatus. Advantages of use of a proxy authentication method are at least one of the following:

a) The proxy authentication method and system of the present invention according to the present invention is an Account Holder Verification that can be used to implement a CVM (Card verification Method) that is much stronger than the "No CVM" method on a transaction terminal, e.g. a payment terminal of which an EMV CAT Level 2 Terminal, EMV CAT Level 3 Terminal, and EMV LVP Terminal, whether attended or not by an operator, are only examples.

b) The proxy authentication method and system of the present invention is a low cost secure method for cardholder verification in offline contactless transactions, since it avoids the encryption of the secret personal identifier such as a PIN, over the transmission medium used between the card device and the transaction terminal, which can be a wireless air interface. Encrypting a PIN with public key digital envelope techniques, as required in an interoperable environment, is time consuming or expensive or both, since the devices involved must have powerful processing capabilities. Therefore, this present invention provides an answer to a long felt need concerning securing against lost or stolen card fraud for offline contactless payments.

c) The proxy authentication method and system of the present invention reduces the transaction time at the point-of-service since it suppresses the need of cardholder verification at the transaction terminal, while offering a high level of security against fraud using lost or stolen cards.

d) The proxy authentication method and system of the present invention allows attainment of secure contactless transaction thresholds up to the same level as PIN-based transactions, without the need of typing in a PIN at the transaction terminal and without the need of an online connection.

e) The proxy authentication method and system of the present invention secures the use of the magnetic stripe of a chip-card used at terminals that are not adapted to read cards with chips such as "EMV terminals". Hence the proxy authentication method according to the present invention works with "non-EMV" transaction terminals, and also at "no-secure" transaction terminals (e.g. no encrypted PIN pad, no SAM, or no mechanical security), and at terminals that are not adapted to read cards with embedded microprocessors such as "EMV terminals" working in a degraded manner, e.g. in the "fallback to magnetic stripe" mode.

f) The proxy authentication method and system of the present invention, when adopted as a CVM, may reduce the need for security requirements that a payment system normally imposes on the transaction terminals at the point-of-service, and may reduce the security needs of an acquirer network, and the payment operator network. For example, in some embodiments, no end-to-end encryption is required, which dramatically decreases the payment system operator's and acquiring banks operational costs.

Further features and advantages of the invention will become apparent from the following description of preferred embodiments of the invention, given by way of examples only, which are made with reference to the accompanying drawings.

DETAILED DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Although the most usual way to represent an Account Holder in a payment transaction is currently through the use of a payment card, reference to Cardholder Verification Method (CVM) as used in credit card, debit card or electronic purse transactions in accordance with the present invention should be interpreted in the broadest possible sense of account holder or account user verification in any transaction processing not just for financial reasons and using an electronic identification device and not only a card. Hence, this invention is not limited to cards. It is also not limited to payment transactions. It can include other electronic payment entities that may represent an Account Holder, e.g. an electronic wallet, PDA, mobile phone, etc., and it is also extended to other types of transaction such as a transaction of proving an identity with a digital passport.

In accordance with an aspect of the present invention, cardholder verification is performed before the transaction, e.g. the payment transaction, is initiated using a cardholder-controlled personal terminal. The cardholder is in possession of an electronic, e.g. digital identification device, such as a card device for use in payments, e.g. a smart card, a credit card, debit, card, electronic purse, etc. The electronic, e.g. digital identification device is preferably small and easily transportable, e.g. can be a hand held device, and is preferably not larger than hand-grip size, for example, it can be pocket sized or smaller device. The electronic, e.g. digital identification device may be a "card device" and may be any shape, e.g. a flat card, a cylindrical memory device, a solid state memory, etc. The card device can be a smart card, chip card, or integrated circuit(s) card (ICC), or any pocket-sized card with embedded integrated circuits. The card device is preferably also a memory card containing at least a non-volatile memory storage component and a means for communication with the external environment, e.g. electric contacts or a wireless connection, and some specific security logic. At least one memory in the electronic, e.g. digital identification device is preferably secure. The electronic, e.g. digital identification device may contain various types of digital memory, e.g. random access memory and non-volatile memory and a digital processing component such as microprocessor. The card device may also be a "smart card"; i.e. a microprocessor card of credit card dimensions or smaller, e.g. like a GSM SIM card, with preferably various tamper-resistant properties, e.g. a secure crypto-processor, secure file system, human-readable features, and is capable of providing security services, e.g. confidentiality of information in the memory. The electronic, e.g. digital identification device may also be in other forms and make use of other communication protocols, e.g. it may be a PCMCIA device, a mobile phone, a PDA with a means for communicating with a personal terminal, e.g. via wireless (e.g. radio or optical) or by cable, etc. The electronic, e.g. digital identification device may be battery driven or may have no battery and is provided by power from the personal terminal or other device, e.g. via contact or wirelessly.

A personal terminal as used in the present invention may be any suitable terminal with the capability to communicate with the electronic, e.g. digital identification device. Such communication may be digital. It can be battery driven or driven from any other electrical supply. It can be a hand-held device and may be hand-grip size or pocket sized or smaller. However the personal terminal may also be larger in size, for instance it may be a fixed terminal in an automobile, a lap top computer etc. The personal terminal will generally include a processing component such as a microprocessor and various types of memory such as random access memory and non-volatile memory. It will also have a means for communication with the digital identification device, e.g. via a cable or wireless connection (e.g. optical or radio). The personal terminal also has a means for entering a verification information, e.g. an identification code such as a PIN, a voice recognition code, a thumb print or an iris image of the cardholder.

A personal terminal of the present invention may be implemented in a dedicated device in standalone form (either handheld or free-standing) or comprised within a larger device or host device/system comprising other functionality, for example a mobile communications device, PDA, personal computer, laptop, game console etc. Such apparatus, system or devices may comprise a single integrated circuit or alternatively the different functionalities may be provided by or implemented in separate component parts of separate integrated circuits.

The personal terminal of the present invention may be incorporated advantageously, at least in part, within the user's electronic, e.g. digital identification device by for example the use of a fingerprint reader and/or digit entry-pad built into an electronic, e.g. digital identification device such as a card device. Such built-in personal payment digital identification devices may have to be physically thicker than conventional bank cards. In this case such digital identification devices may need to interact with a transaction terminal using contactless means, e.g. wireless.

The cardholder verification stage can be done, for example, in the proximity of a transaction terminal, e.g. point-of-service terminal such as a point-of sale terminal. However, the present invention is not limited thereto and "cardholder verification" can occur some time before the cardholder interacts with the payment terminal and there is no requirement that the cardholder be in proximity of the payment terminal. For increased security it is preferred to have cardholder verification occur with a short period of time before the transaction, e.g. payment phase, but it is not required to be a short time, nor in proximity of the transaction, e.g. payment terminal. Cardholder information used to perform the verification may comprise verification information of which a verification code such as a PIN is one example, e.g. a secret identification code such as a PIN is keyed into the personal terminal using any suitable PIN-accepting entry method of the personal terminal. Any method of entering verification information can be used with the present invention, e.g. such as typing onto a keyboard or keypad, entering data via a touch screen, speech entry using voice recognition, etc. Cardholder information used to perform the verification may be derived by the cardholder using a biometric method, such as using a fingerprint scanner on the personal terminal or on the electronic, e.g. digital identification device or by any other means of information entry used in verification. The present invention is not considered to be limited by the method or apparatus used to introduce verification information such as a code, and all other verification methods are included within the scope of the present invention, e.g. they include those based on any other biometric, such as, for example, cardholder iris scanning which may be achieved by the use of a camera in the personal terminal.

Interaction between the cardholder, the electronic, e.g. digital identification device, such as a chip-card, and the personal terminal produces evidence of cardholder's authenticity. At its simplest, this evidence will comprise the generation of a proxy verification flag which is stored on the electronic, e.g. digital identification device. The evidence of authenticity may also comprise a cryptographic authentication token which is also stored on the digital identification device. Preferably, an authentication token is a dynamic cryptogram that produces a different number each time and can be used in part or in entirety as an OTP (one-time PIN). Because the token/OTP is never reused it can be used and transferred to and by a transaction terminal in an open non-secure manner. A proxy verification flag indicates confirmation of verification that verification information entered on the personal terminal in conjunction with the electronic, e.g. digital identification device is successful, e.g. a PIN, keyed into the personal terminal when in communication with the electronic, e.g. digital identification device, matches the PIN stored in a secure memory of the electronic, e.g. digital identification device; or a proxy verification flag indicates confirmation of verification that a scanned fingerprint matches the fingerprint pattern stored in the secure memory of the electronic, e.g. digital identification device. A proxy verification flag may be presented to the transaction, terminal e.g. payment terminal in any suitable manner, e.g. by using contacts, especially electrical contacts, between the transaction terminal and the electronic, e.g. digital identification device allowing data transfer, or in a contactless, e.g. via a wireless transfer of which use of the Bluetooth™ protocol or ISO 14443 are only examples. A proxy verification flag may be presented to the transaction terminal, e.g. payment terminal in an explicit form. For example, the flag may be a graphic, a pictogram, a numeric, an alphanumeric, or a text code that can be input by means of a communication means between the electronic, e.g. digital identification device and the transaction terminal. This informs the transaction terminal of the fact that authentication has already been performed by the user allowing it to change the way it performs a transaction.

In order to avoid active attacks that may attempt to change the status of the proxy verification flag from not-verified to verified during its transmission from the electronic, e.g. digital identification device to the transaction terminal, the electronic, e.g. digital identification device preferably includes the status of this flag in the form of a computation of an additional checking mechanism, e.g. by means of a cryptographic code that may be verified either offline by the transaction terminal or online by an Authorization Host of the electronic, e.g. digital identification device issuer. For example, this cryptographic code may take the form of a digital signature, in case offline verification is required, or of a Message Authentication Code, in case online verification is performed.

Such evidence of authenticity is transferred to the transaction terminal, e.g. point-of-service terminal, e.g. point of sale terminal, from the electronic, e.g. digital identification device to facilitate completion of the transaction, e.g. payment. Preferably, the evidence can be transferred without the cardholder having to transfer data manually, e.g. transfer can be automatic from the electronic, e.g. digital identification device to the transaction terminal via contacts or by contactless means, e.g. wireless preferably in one single step. Nonetheless, the evidence may be also transferred manually by for example the cardholder keying-in the OTP into the keypad of the point-of-service terminal where the OTP may for example comprise six to eight digits of the authentication token.

The present invention provides many benefits and solves many problems related to credit card, debit card and/or electronic purse transactions and, by way of example only, solutions to the above-mentioned problems are described below:

a) Fraud at non-EMV terminals such as skimming attack recording of PIN and magnetic stripe information will not work because of the use of the OTP method means that any attempt to reuse a fraudulently copied OTP will fail.

b) Automatic transfer of evidence of authenticity provides security at EMV CAT level 2 and level 3 transactions and therefore transaction limits may be safely raised.

c) Automatic transfer of evidence of authenticity improves security in contactless card transactions that maintain the 'Tap & Go' convenience and speed and therefore transaction amount limits may be safely raised or removed.

d) Security can be maintained while transaction terminal costs may be significantly reduced by removing any need for an encrypted PIN-pad, a Secure Application Module (SAM) for proprietary encrypted off-line PIN and secure chip-card readers. This is because the OTP may be captured by a transaction terminal and transferred to the issuer via open non-secure means without compromising security. Similarly the proxy flag may be included in a transaction, e.g. payment related cryptogram calculation. An example of such a low-cost transaction terminal may consist of a mobile phone that incorporates (or can communicate with) any form of communications means to communicate with an electronic, e.g. digital identification device, e.g. the identification device may be a magnetic strip card and the personal terminal has a magnetic stripe reader. During the payment transaction the Cardholder swipes his magnetic stripe card in the magnetic stripe reader but instead of typing in his PIN into the insecure keyboard of the mobile phone he types in evidence of the proxy verification flag, such as an OTP derived from the verification flag, which is obtained from his personal terminal. Unauthorized eavesdropping of the proxy verification flag on the electronic identification device-transaction terminal interface, which may be required for the completion of an offline transaction, reveals nothing of the Cardholder's secret verification information, such as a PIN or fingerprint.

e) Network operation costs can be reduced while maintaining security because there are no requirements for encrypted online PIN verification; the OTP may be captured and transferred to the issuer via open non-secure means.

f) Cardholder's interaction time at a point-of-service is low because entry by the cardholder of secret verification information is easy, e.g. he types-in a PIN into the personal terminal, or uses a fingerprint scanner on the personal terminal, before initiating the point-of-service interaction.

g) Fraud cannot occur through active attacks on contactless cards, e.g., the electronic pick-pocketing and re-presentation (also known as re-play attacks)', since the Payment Application (see item 204 FIG. 2) in the electronic, e.g. digital identification device cannot engage in a payment transaction, unless the status of the proxy verification flag is 'valid'. The flag would not be set in the 'valid' status, unless the explicit cardholder authentication is successful.

h) Low costs can be achieved and high security can be achieved for off-line payment methods by removing a requirement for a cardholder to key-in a PIN into a transaction terminal. For example, when a contact electronic identification device such as a chip-card is inserted into a suitable reader, e.g. a chip-card-reading transaction terminal, the status of the proxy verification flag provides payment authorization. The proxy verification flag within the cardholder's electronic, e.g. digital identification device, e.g. chip-card, is only generated when the cardholder enters the verification information into the personal terminal, e.g. types-in a PIN into the personal terminal, or uses a fingerprint scanner on the personal terminal or other CVM method, before inserting the electronic, e.g. digital identification device, e.g. chip-card into the chip-card reading transaction terminal. Contactless methods may be used for communications between electronic, e.g. digital identification device, e.g. chip-card and transaction terminal as an alternative to contact means.

i) Low costs can be maintained and high security can be achieved with LVP card systems without a requirement for a cardholder to key-in a PIN at the transaction terminal. When the electronic, e.g. digital identification device, e.g. a chip-card is inserted into a suitable reading device, e.g. a chip-card-reading transaction terminal, the status of the proxy verification flag provides payment authorization as described above.

The present invention will now be described with reference to certain embodiments that mainly relate to the use of cards as an electronic, e.g. digital identification device according to the present invention. However these embodiments are provided as examples only. It will be understood by persons skilled in the art that many other systems, devices and methods can be advantageously designed incorporating the present invention.

Figure 1:
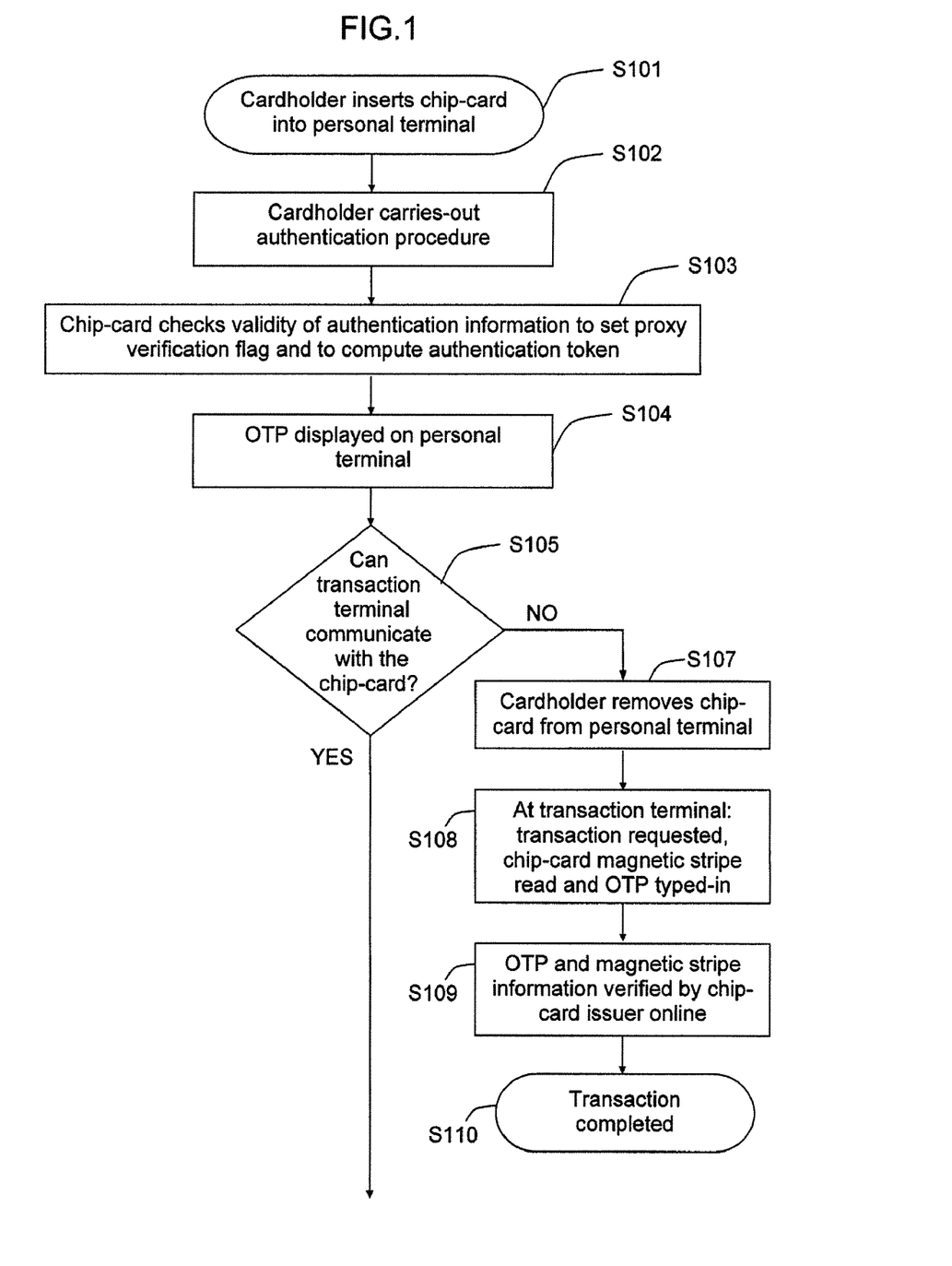
FIG. 1 is a flow chart showing a preferred embodiment of apparatus and method according to an embodiment of the present invention.

A preferred embodiment of apparatus and method according to an aspect of the present invention is shown in the flow chart of FIG. 1. At step S101 the cardholder inserts his electronic, e.g. digital identification device, which in the following description is a chip-card 200, into his personal terminal 300 and this is shown in FIG. 5 where the cardholder 501 is shown holding his personal terminal with his chip-card inserted into the slot within the personal terminal. If the electronic, e.g. digital identification device, e.g. chip-card is a contactless chip-card the chip-card may be inserted into a slot in the personal terminal or it may simply be brought into close proximity to the personal terminal. The step S101 operation will usually be carried out in proximity to the transaction terminal at the point-of-sale but before any interaction with the transaction terminal is initiated. The Chip-card is described in more detail with reference to FIG. 2 below. The personal terminal is describing in more detail with reference to FIGS. 3 and 4 below.

Figure 2:
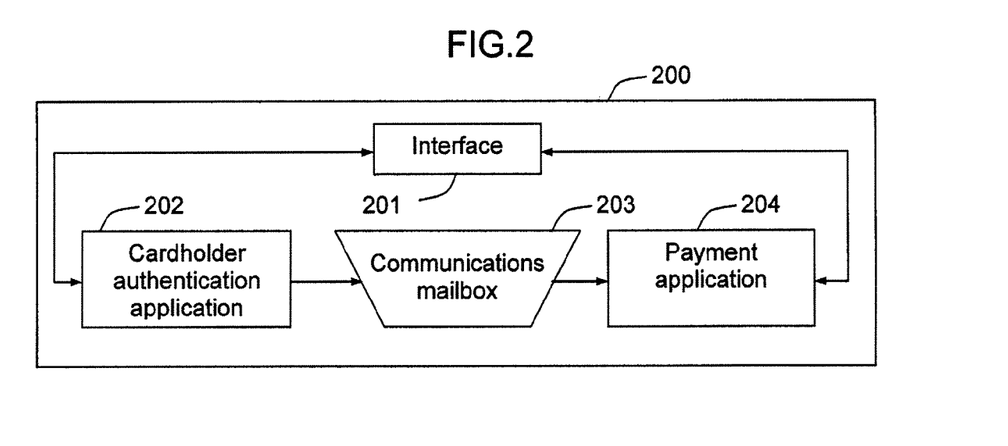
FIG. 2 shows a electronic identification device such as a chip-card incorporating adapted software according to an embodiment of the present invention.
Figure 3:
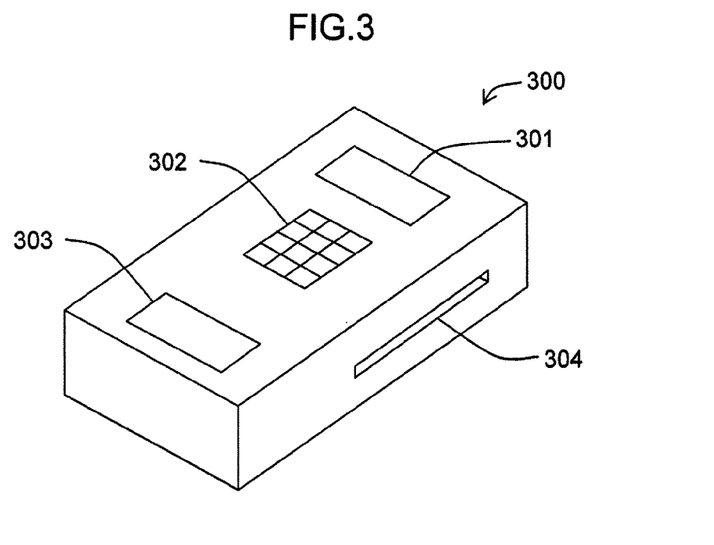
FIG. 3 shows an example of a personal terminal according to an embodiment of the present invention.

Referring again to FIG. 1, at step S102 the cardholder carries out the authentication procedure by interacting with his personal terminal where such procedure may comprise one or more of cardholder keying-in his PIN and/or cardholder operating a fingerprint reading means (alternative and/or additional authentication methods may be used such as for example where the personal terminal contains a camera for iris scanning). At step S103 the cardholder authentication information obtained from step S102 is communicated to the chip-card via the personal terminal interface 402 (FIG. 4) and the chip-card interface 201 (FIG. 2). Then the cardholder authentication application on the chip-card verifies the validity of the authentication information and if valid produces evidence of authenticity where such evidence comprises the setting of a proxy verification flag to represent "valid" and optionally the computing of an authentication token (persons skilled in the art will know that some applications may only require one of proxy verification flag or authentication token or may use alternative evidence of authenticity). At step S104 the personal terminal calculates an OTP from the authentication token and displays the OTP on the personal terminal's display 303 (FIG. 3).

The type of transaction terminal will determine what evidence of authenticity is used and how such evidence is used. At step S105 one path is followed (to step S106) if the transaction terminal can communicate with the chip in a chip-card otherwise a different path is followed (to step S107). An example of a transaction terminal that can communicate with the chip in a chip-card is an EMV terminal.

At step S106 one path is followed (to step S111) if the transaction terminal communicates with chip-cards via contact means otherwise a different path (to step S113) is followed if the transaction terminal communicates with chip-cards via contactless means.

At step S111 (contact transaction terminal) the cardholder removes the chip-card from his personal terminal. At step S112 the cardholder insets the chip-card into the transaction terminal.

At step S113 (contactless transaction terminal) the cardholder may remove the chip-card from his personal terminal. Some applications may require or benefit from the cardholder keeping the chip-card within his personal terminal while the transaction terminal communicates with the chip-card. Some applications may require or the cardholder may desire that the chip-card is removed from the personal terminal before the transaction terminal communicates with the chip-card. At step S114 the cardholder moves the chip-card, whether removed from or still within his personal terminal, into proximity of the transaction terminal.

At step S115 the transaction terminal is able to communicate with the chip in the chip-card and the transaction terminal does not need to have a PIN-pad, a fingerprint scanner or a magnetic stripe reader. The requested transaction value information is entered into the transaction terminal by the cardholder or a vendor for example (such value information may be entered at an earlier stage if appropriate). At step S116 one path is followed (to step S117) if the transaction terminal is off-line and cannot communicate with the chip-card issuer otherwise a different path is followed (to step S118) if the transaction terminal can go on-line and communicate with the chip-card issuer.

At step S117 (off-line) the transaction terminal communicates with the chip-card to receive the proxy verification flag status and the cryptographic code. In systems such as EMV, this could be an asymmetric signature such as "CDA" that authenticates the transaction certificate to the terminal and may also authenticate the proxy authentication flag.

At step 117' the transaction terminal verifies the cryptographic code to get assurance that the status of the proxy verification flag was not maliciously modified on the card-transaction terminal interface. If the cryptographic code verifies correctly and the proxy verification flag status shows that the cardholder was successfully authenticated the transaction is completed at step S119.

At step S118 (on-line) the transaction terminal communicates with the chip-card to receive the proxy verification flag status and the cryptographic code. Then at step S120 the proxy verification flag status and the cryptographic code are communicated on-line to the card issuer. In this case the terminal may use the same methods as step S117 for offline terminals or may rely on the response from the issuer of the card, who verifies the cryptographic transaction data.

At step 120' the Authorization Host of the card issuer verifies the cryptographic code, to get assurance that the status of the proxy verification flag was not maliciously modified on the card-transaction terminal interface. Then, the Authorization Host of the card issuer follows standard transaction authorization methods and communicates with the transaction terminal. If the issuer authorizes the transaction, the transaction is completed at the transaction terminal at step S121.

At step S107 the cardholder removes the chip-card from his personal terminal. At step S108 the transaction terminal cannot communicate with the chip in the chip-card but can read the magnetic stripe on the chip-card. The transaction terminal will have a PIN-entry capability such as a pad, however the PIN entry device does not require any special security such as encryption or tamper resistance. The transaction terminal will be able to go on-line to the card issuer. The requested transaction value information is entered into the transaction terminal by the cardholder or a vendor for example. Magnetic stripe information is transferred from the card to the transaction terminal either automatically if the card is inserted into the terminal or manually by the use of a swipe-card reader. The cardholder reads the OTP from the display on his personal terminal and types-in the OTP using the PIN entry device such as a pad on the transaction terminal. Then at step S109 information read from the magnetic stripe and the OTP are communicated on-line to the card issuer. The card issuer verifies the validity of the OTP and uses information from the card's magnetic stripe and then follows standard transaction authorization methods and communicates with the transaction terminal. If the issuer authorizes the transaction, the transaction is completed at the transaction terminal at step S110.

FIG. 2 shows a chip-card incorporating adapted software according to an aspect of the present invention. The chip-card 200 may comprise any existing contact or contactless chip-card for the purposes of providing one or more of credit, debit or electronic-purse services to the cardholder. The chip-card may include a standard credit/debit card magnetic stripe. Examples of such chip-cards are M/Chip 4 and PayPass M/Chip 4. The authentication flag may be the least significant bit of a counter such as the EMV ATC or it may be a separate tag used specifically for this purpose.

The chip (not shown) within the chip-card 200 carries out software and/or hardware functions and only those functions adapted for the present invention are shown which comprise cardholder authentication application 202, communication mailbox 203 and payment application 204. The chip-card additionally comprises a communications interface 201 where such interface may comprise one or more of electrical contacts and/or wireless antenna.

During the cardholder authentication procedure (steps S101 to S104 in FIG. 1) the cardholder authentication application 202 communicates with the personal terminal (300 in FIGS. 3, 4 and 5) via the interface 201. Cardholder authentication information such as keyed-in PIN and/or scanned fingerprint information is received by the cardholder authentication application. The cardholder authentication application uses the authentication information to determine the authenticity of the cardholder by for example comparing the authentication information with the PIN and/or fingerprint information stored within secure memory on the chip-card and if the cardholder is authenticated the cardholder authentication application sets a proxy verification flag to represent "valid". The cardholder authentication application stores the proxy verification flag in the communications mailbox 203 where the communications mailbox may be implemented as an internal elementary file or as a shared area of non volatile memory or as a flag in one application that may be queried by the other application by a means of "delegation" in such a manner known to those skilled in the art.

During interactions with a transaction terminal where the transaction terminal can communicate with a chip-card where for example the transaction terminal is EMV compliant (steps S106 and steps S111 to S121 in FIG. 1) the payment application 204 communicates with the transaction terminal (not shown) via the interface 201. During such communication the payment application 204 reads the proxy verification flag from the communications mailbox 203 and then it is transferred to the transaction terminal by including it in the transaction related data of the payment application.

FIG. 3 shows an example personal terminal 300 according to an aspect of the present invention and shows where a card slot 304 for receiving a chip-card, a fingerprint reader/scanner 301, a PIN-pad 302 and a display 303 may be positioned.

Figure 4:
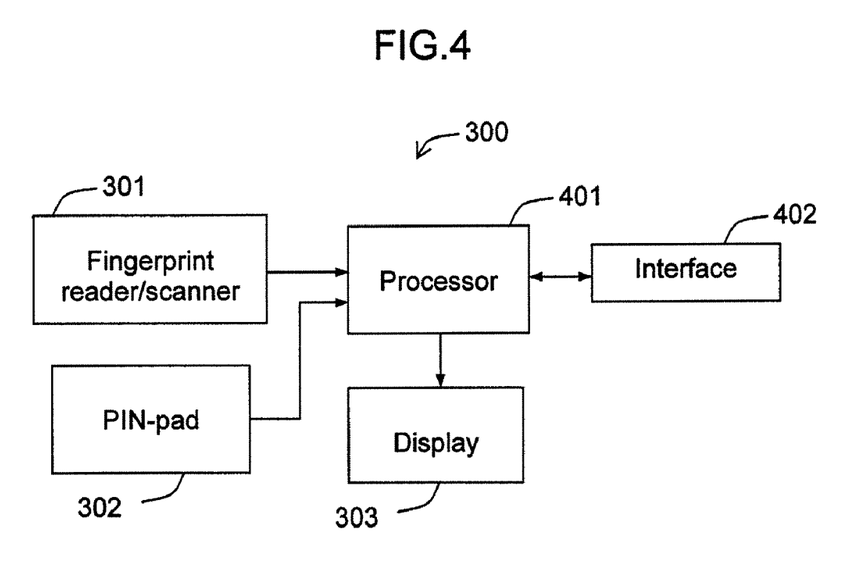
FIG. 4 is a block diagram of an example personal terminal according to an embodiment of the present invention.
Figure 5:
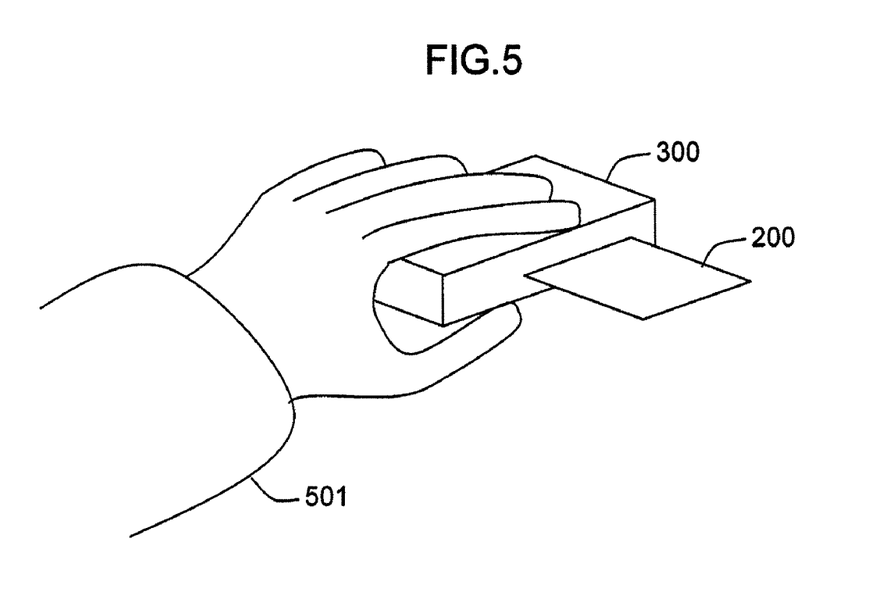
FIG. 5 shows a cardholder holding a personal terminal with an electronic identification device such as a chip-card inserted into the terminal.

FIG. 4 is a block diagram of an example personal terminal 300 according to an aspect of the present invention. The personal terminal comprises an interface 402, a processor 401 and in addition may comprise a fingerprint reader/scanner 301, a PIN-pad 302 and/or a display 303. Additional or alternative cardholder authentication information gathering means may be included such as for example a camera for reading cardholder iris patterns. Additionally and not shown, a power source such as a battery may be included and/or alternative power deriving and/or power sending means such as an inductive-coupling antenna may be included. Such a power source may provide power via contact or contactless means to a chip-card inserted into the card-slot 304 (FIG. 3) or in proximity to the personal terminal 300. The processor 401 communicates with interface 402, fingerprint reader/scanner 301, PIN-pad 302 and/or display 303. Interface 402 may comprise an electrical chip-card contact interface within a card-slot 304 (FIG. 3) and/or may comprise a contactless interface with or without a card-slot. The processor controls communication of data to and/or from the interface, fingerprint reader/scanner, PIN-pad and/or display in such a manner according to procedures described for FIG. 1 and FIG. 2.

Figure 6:
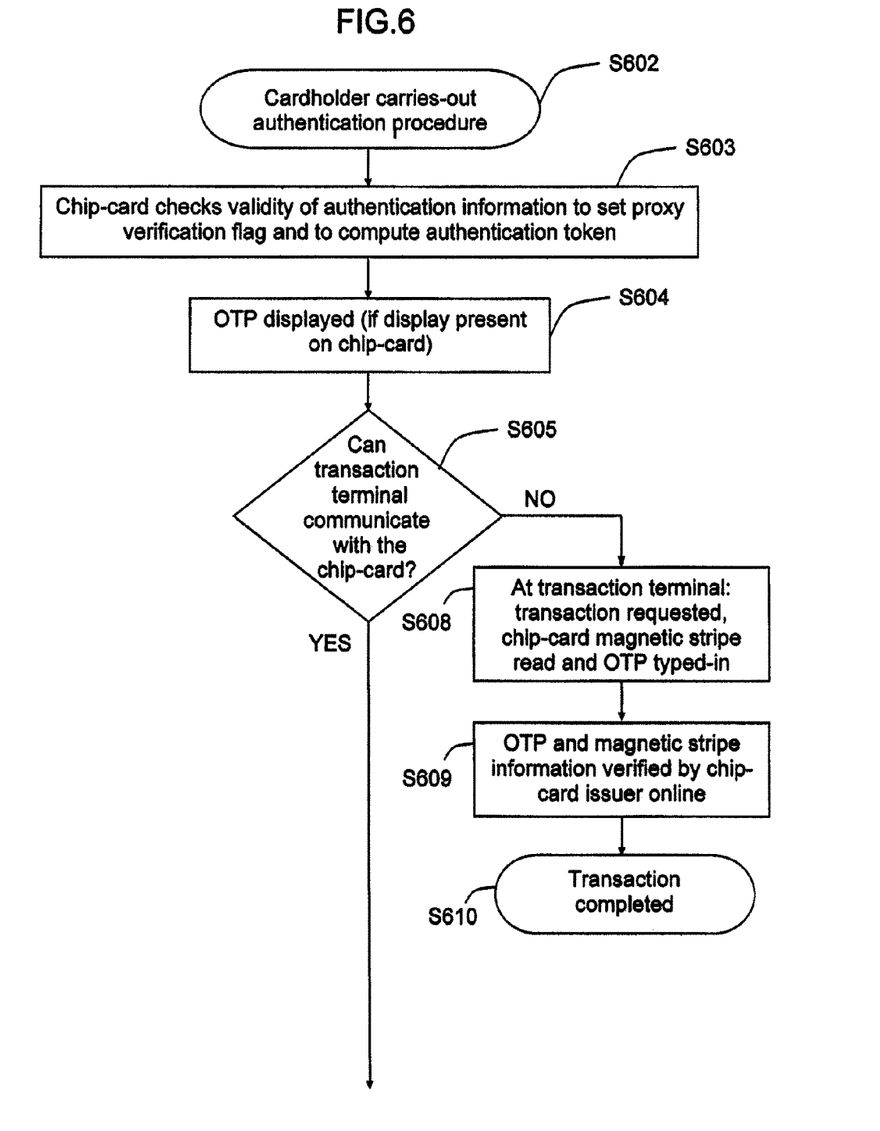
FIG. 6 is a flow chart showing a further preferred embodiment of apparatus and method according to the present invention where the functionality of a personal terminal is incorporated within an electronic identification device such as a chip-card.

A second preferred embodiment of apparatus and method according to an aspect of the present invention is shown in the flow chart of FIG. 6. In this embodiment procedures and security methods work in the way described for FIGS. 1 to 4 except that in this embodiment the functionality of the personal terminal is incorporated within the chip-card. The chip-card of this embodiment will therefore be an adaptation of a standard chip-card and will comprise a chip, a contact and/or contactless interface and in addition one or more of a fingerprint reader/scanner, a PIN-pad and/or a display. Where such an adapted chip-card is too thick to be inserted into a standard card-slot within a transaction terminal then communications between the chip-card and transaction terminal may be via contactless means. Alternatively such an adapted card may be dual thickness allowing a chip contact portion to be inserted into a standard card-slot within a transaction terminal. Such an adapted chip-card may include a power source such as for example a thin battery. Such an adapted chip-card may derive power via contactless means in proximity to a transaction terminal for example.

At step S602 the cardholder carries out the authentication procedure by interacting with his chip-card where such procedure may comprise one or more of cardholder keying-in his PIN and/or cardholder operating a fingerprint reading means (alternative and/or additional authentication methods may be used such as for example where the chip-card contains a camera for iris scanning). Step S602 will usually be carried out in proximity to the transaction terminal at the point-of-sale but before any interaction with the transaction terminal is initiated.

At step S603 the cardholder authentication application on the chip-card verifies the validity of the cardholder authentication information obtained from step S602 and if valid produces evidence of authenticity where such evidence comprises the setting of a proxy verification flag to represent "valid" and optionally the computing of an authentication token (persons skilled in the art will know that some applications may only require one of proxy verification flag or authentication token or may use alternative evidence of authenticity). At step S604 the chip-card may calculate an OTP from the authentication token and display the OTP on the display if the chip-card contains a display and if the cardholder authentication application 202 (FIG. 2) implements a truncation algorithm similar to that implemented by the personal terminal.

The type of transaction terminal will determine what evidence of authenticity is used and how such evidence is used. At step S605 one path is followed (to step S606) if the transaction terminal can communicate with the chip in a chip-card otherwise a different path is followed (to step S608). An example of a transaction terminal that can communicate with the chip in a chip-card is an EMV terminal.

At step S606 one path is followed (to step S612) if the transaction terminal communicates with chip-cards via contact means otherwise a different path (to step S614) is followed if the transaction terminal communicates with chip cards via contactless means.

At step S612 (contact transaction terminal) the cardholder inserts the chip-card into the transaction terminal. At step S614 the cardholder moves the chip-card into proximity of the transaction terminal.

At step S615 the transaction terminal is able to communicate with the chip on the chip-card and the transaction terminal does not need to have a PIN entry capability such as a pad, a fingerprint scanner or a magnetic stripe reader. The requested transaction value information is entered into the transaction terminal by the cardholder or a vendor for example (such value information may be entered at an earlier stage if appropriate). At step S616 one path is followed (to step S617) if the transaction terminal is off-line and cannot communicate with the chip-card issuer otherwise a different path is followed (to step S618) if the transaction terminal can go on-line and communicate with the chip-card issuer.

At step S617 (off-line) the transaction terminal communicates with the chip-card to receive the proxy verification flag status and the cryptographic code. At step 617' the transaction terminal verifies the cryptographic code to get assurance that the status of the proxy verification flag was not maliciously modified on the card-transaction terminal interface. If the cryptographic code verifies correctly and the proxy verification flag status shows that the cardholder was successfully authenticated the transaction is completed at step S619.

At step S618 (on-line) the transaction terminal communicates with the chip-card to receive the proxy verification flag status and the cryptographic code. Then at step S620 the proxy verification flag status and the cryptographic code are communicated on-line to the card issuer. At step 620' the Authorization Host of the card issuer verifies the cryptographic code, to get assurance that the status of the proxy verification flag was not maliciously modified on the card-transaction terminal interface. Then, the Authorization Host of the card issuer follows standard transaction authorization methods and communicates with the transaction terminal. If the issuer authorizes the transaction, the transaction is completed at the transaction terminal at step S621.

At step S608 the transaction terminal cannot communicate with the chip in the chip-card but can read the magnetic stripe on the chip-card. The transaction terminal will have a PIN entry capability such as a pad, however the PIN entry capability does not require any special security such as encryption or tamper resistance. The transaction terminal will be able to go on-line to the card issuer. The requested transaction value information is entered into the transaction terminal by the cardholder or a vendor for example. Magnetic stripe information is transferred from the card to the transaction terminal either automatically if the card is inserted into the terminal or manually by the use of a swipe-card reader (the adapted chip-card will have to be thin enough for its magnetic stripe to be read by magnetic stripe readers in conventional transaction terminals). The cardholder reads the OTP from the display on his chip-card and types-in the OTP using the PIN entry capability such as a pad on the transaction terminal. Then at step S609 information read from the magnetic stripe and the OTP are communicated on-line to the card issuer. The card issuer verifies the validity of the OTP and uses information from the card's magnetic stripe and then follows standard transaction authorization methods and communicates with the transaction terminal. If the issuer authorizes the transaction, the transaction is completed at the transaction terminal at step S610.

Devices in accordance with the present invention such as the electronic, e.g. digital identification device and the person terminal may include a processing engine such as a microprocessor but such a processing engine may be replaced by any other suitable processing engine, e.g. an FPGA. Thus, one or more aspects of the present invention the devices such as the digital identification device and the person terminal can be implemented in digital electronic circuitry, or in computer hardware, firmware, software, or in combinations of them. Furthermore, aspects of the invention can be implemented in a computer program product tangibly embodied in a carrier medium carrying machine-readable code for execution by a programmable processor. Method steps of aspects of the invention may be performed by a programmable processor executing instructions to perform functions of those aspects of the invention, e.g., by operating on input data and generating output data.

Furthermore, aspects of the invention can be implemented in a computer program product tangibly embodied in a carrier medium carrying machine-readable code for execution by a programmable processor. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Volatile media includes mass storage. Volatile media includes dynamic memory such as RAM. Common forms of computer readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read. Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to a bus can receive the data carried in the infrared signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

What is claimed is:

1. A method for authorizing a transaction using a personal terminal, a transaction terminal and an electronic identification device having memory, the electronic identification device having been offered up to the personal terminal for communication therewith and verification information having been entered into the personal terminal, the method comprising:
    receiving the verification information at the electronic identification device from the personal terminal;
    the electronic identification device verifying if the verification information is valid and setting a status of a verification flag in the memory of the electronic identification device indicative of the verification information being valid prior to introducing the electronic identification device to the transaction terminal;
    receiving evidence of the status of the verification flag at the transaction terminal from the electronic identification device after introducing the electronic identification device to the transaction terminal;
    verifying the status of said verification flag was not maliciously modified; and
    receiving data indicating that the transaction was authorized.

2. The method of claim 1 wherein the evidence is generated by the electronic identification device by a computation of cryptographic code.

3. The method of claim 2, wherein the cryptographic code is in the form of a digital signature.

4. The method of claim 1, wherein the transaction terminal verifies the evidence offline.

5. The method of claim 1, wherein verification of the evidence is carried out online by an authorization entity of an issuer of the digital identification device.

6. The method of claim 5, wherein the evidence is a Message Authentication Code.

7. The method of claim 1, wherein the verification information is a secret identification code.

8. The method of claim 1, wherein the verification information is biometric data.

9. The method of claim 1 further comprising storing a cryptographic authentication token in the electronic identification device, the cryptographic authentication token being evidence of the status of the verification flag.

10. The method according to claim 1, wherein the transaction terminal authorizes a transaction at the transaction terminal in response to the receipt of the evidence.

11. The method according to claim 10, wherein the evidence is transmitted from the transaction terminal to the authorization entity over a communications link; further comprising: receiving a response from said authorization entity; and authorizing a transaction at the transaction terminal in response to said receiving step.

12. A system for authorizing a transaction using a personal terminal, a transaction terminal and an electronic identification device having memory, the electronic identification device having been offered up to the personal terminal for communication therewith and verification information having been entered into the personal terminal and communicated to the electronic identification device, wherein:
    the electronic identification device has means for verifying if the verification information received from the personal terminal is valid and for setting a status of a verification flag in the memory of the electronic identification device indicative of the verification information being valid prior to introducing the electronic identification device to the transaction terminal, and
    the transaction terminal has means for receiving evidence of the status of the verification flag at the transaction terminal from the electronic identification device after introducing the electronic identification device to the transaction terminal;
    means for verifying the status of said verification flag was not maliciously modified; and
    means for receiving data indicating that the transaction was authorized.

13. The system of claim 12 wherein the electronic identification device and/or the personal terminal has means for generating the evidence as a cryptographic code.

14. The system of claim 13, wherein the means for generating evidence as a cryptographic code has means for generating a digital signature.

15. The system of claim 12, wherein the transaction terminal has means for verifying the evidence offline.

16. The system of claim 12, wherein the system has means for verification of the evidence online by an authorization entity of an issuer of the electronic identification device.

17. The system of claim 16, wherein the evidence is a Message Authentication Code.

18. The system of claim 12, wherein the verification information is a secret identification code.

19. The system of claim 12, wherein the electronic identification device has means for storing a cryptographic authentication token in the digital identification device, the cryptographic authentication token being evidence of the status of the verification flag.

20. The system according to claim 12, wherein the transaction terminal has means to authorize a transaction at the transaction terminal in response to the receipt of the evidence.

21. The system according to claim 20, wherein the transaction terminal has means for transmitting the evidence from the transaction terminal to the authorization entity over a communications link, means for receiving a response from said authorization entity; and authorizing a transaction at the transaction terminal in response to said receiving step.

* * * * *